Aug. 7, 1928.
D. H. SWEET
1,679,882
MEASURING VALVE
Filed July 30, 1926
Fig. 1.
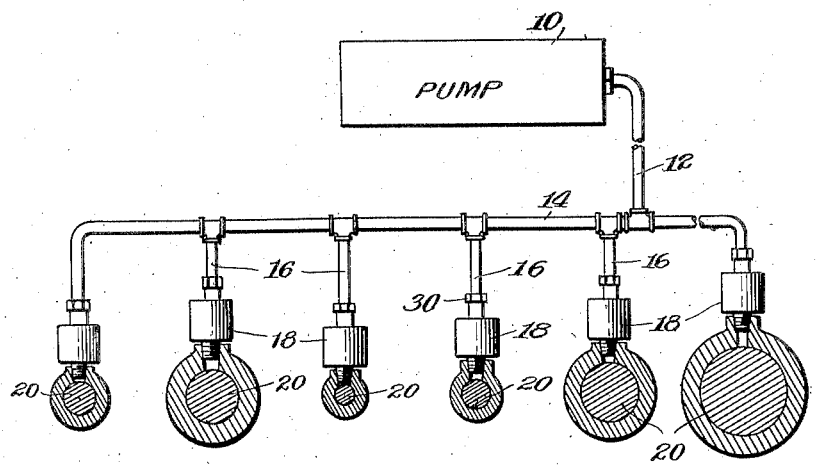
Fig. 2.
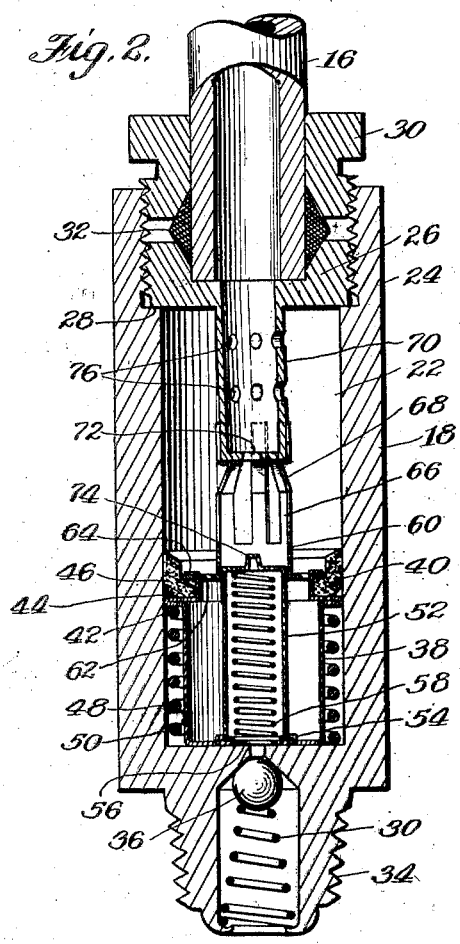
Fig. 3.
Inventor
Donald H. Sweet
By Pierce and Sweet
Attys.

Patented Aug. 7, 1928.

1,679,882

UNITED STATES PATENT OFFICE.

DONALD H. SWEET, OF EVANSTON, ILLINOIS, ASSIGNOR TO THE BASSICK MANUFACTURING COMPANY, OF CHICAGO, ILLINOIS, A CORPORATION OF DELAWARE.

MEASURING VALVE.

Application filed July 30, 1926. Serial No. 125,980.

My invention relates to lubrication and more specifically to lubricating systems of a type especially adapted for use on motor vehicles for securing automatic lubrication of the chassis bearings.

Among the objects and advantages of the invention is the provision of a measuring, or apportioning, valve or means which will operate without any leakage effect at any portion of its normal cycle.

Another object is the production of a device such that it is impossible to hold the parts open by any abnormal pressure fluctuation within the capacity of the pressure supply means.

Further objects and advantages of the invention will become apparent as the description proceeds.

In the accompanying drawings:

Figure 1 is a diagram indicating a system of the type to which my invention is applicable;

Figure 2 is a central, longitudinal section, very much enlarged, through one of the measuring valves; and Figure 3 is a section on line 3—3 of Figure 2.

In the embodiment of the invention selected for illustration there is indicated a suitable source of lubricant under pressure in the nature of a pump 10 connected by a conduit 12 to a main 14 from which branches 16 lead to the individual measuring devices 18 rationing the lubricant for the bearings 20 to which they are attached. The pump 10, except that it must have certain pressure producing characteristics well known to the prior art, may be of any suitable or preferred type, such, for instance, as the pump described and illustrated in the copending application of Locke, Dosch and Stegeman, Serial No. 567,906, filed June 13, 1922. As the details of the pump per se have no bearing on the present invention, this description has not been encumbered with such details.

Referring, now, to Figure 2, the conduit 16 discharges into a chamber 22 defined by the body member 24 and a suitable coupling connection comprising an end piece 26 threaded into the body against a stop shoulder 28 and a fastening nut 30 adapted to compress the ring 32 on the tube 16 and clamp it firmly in place. The discharge end of the body 24 is provided with a pipe threaded terminal 34 housing an outlet check valve 36 of well known design.

The pump delivers a brief pressure impulse at relatively long intervals of time, and relieves the pressure at the end of the impulse so that intervals between are periods of relatively low pressure in the supply tube 16. Within the chamber 22 I have provided means actuated automatically between variations in the supply pressure for permitting the discharge of a predetermined amount of lubricant during each pressure cycle. In Figure 2 the parts are shown in the position they occupy at the end of the discharge stroke, previous to relief of pressure in the supply tube 16.

The main piston 38 comprises a cup opening toward the inlet with suitable lubricant pressed sealing means in the nature of a cup leather 40 at its upper end. In the embodiment illustrated the wall of the cup is smaller than the diameter of the chamber 22 and is turned out at 42, in again at 44 and up at 46 to define an annular seat for the cup leather and an annular housing space at 48 for the return spring 50. Inside the main piston I provide a smaller valve piston 52 in the shape of a cup opening toward the outlet end and adapted to seat on a fiber sealing washer 54 surrounding an outlet opening 56 in the bottom of the main piston 38. The return spring 58 for the valve piston 52 bears, at its lower end, directly on the wall of the chamber 22, and at its upper end against the bottom of the cup.

Mounted on the main piston 38 I provide a trigger locking element in the form of a ring 60 apertured at 62 to receive clamping fingers 64 projecting up from the main piston. The flange thus employed to fasten the ring 60 to the main piston also forms a clamping washer for the cup leather 40. A plurality of resilient locking fingers 66 projects upwardly from the ring 60 having inwardly projecting locking portions 68 adapted to snap over the lower corner of the inlet tube 70, which I have illustrated as integral with the end piece 26. The end of the inlet tube 70 is provided with a relatively small discharge opening 72 adapted to receive and guide a central tip 74 in the bottom of the piston valve, and the sides of the tube are provided with a plurality of relatively large apertures 76 constituting the main means of communication with the chamber 22.

The operation of the device through a complete cycle, beginning with the position illustrated in Figure 2, is as follows:

The pump 10 is designed to produce a pressure impulse of a predetermined amount, say, for instance, 200 pounds per square inch. The strength of the spring 50 for use in connection with such a pump may correspond to a hydraulic pressure over the area of the main piston of the order of magnitude of 60 pounds per square inch. The strength of the spring 58 may correspond to a hydraulic pressure over the area of the piston valve of the order of magnitude of 40 pounds per square inch. The back pressure of the check valve 36 may be of any amount within the capacity of the pressure supply means, but will ordinarily be of the order of magnitude of 30 pounds per square inch. The drop in pressure in the chamber 22 above the barrier established by the piston and piston valve will continue until the pressure has been reduced below that necessary to hold the piston valve 52 closed. Prior to that time, the pressure will cease to hold the main piston against the discharge end of the chamber in opposition to the force of the spring 50, but the hooks 68 form a mechanical lock so that the force of the spring will merely be transferred from the lubricant to the hooks 68 without any appreciable movement of the main piston. As soon as the supply pressure has fallen sufficiently to permit the spring 58 to open the piston valve, that part will move back into abutment with the end of the inlet tube 70. The tip 74 will enter the opening 72 and the bottom of the valve will slide on the inclined portions of the projections 68 and press them out until they snap onto the cylindrical portion of the tube 70. No further movement of the valve piston will occur.

The release of the projections 68 permits the spring 50 to move the main piston up until its further progress is arrested by contact between the piston valve and its seat 54. During this movement a volume of lubricant equal to the cross sectional area of the chamber 22 multiplied by the stroke of the piston will be transferred to the lower side of the barrier now re-established at a higher level, ready for discharge through the check valve 36 on the next pressure impulse.

Because the aggregate area of the openings 62 is many times greater than the opening for the check valve 36, it will be impossible for any pressure that the pump 10 could possibly develop to arrest the return stroke of the main piston and hold it in an intermediate position after the hooks 68 have been released, in which condition there would be an open passage through the device. Thus, with the spring strengths above mentioned, a pressure drop of 60 pounds per square inch through the openings 62 would have to be maintained by the rapidity of the discharge. But, with the valve 36 of ⅛ the area of the openings 62, the pressure drop through the valve opening for the same rate of flow would have to be approximately 480 pounds per square inch. This is not only more than twice the pressure producing capacity of the supply pump, but the volume discharged would be relatively large and the pressure would have to be maintained in spite of such a continuous discharge. Similarly, to create a pressure difference through the orifices 62 that would stop the valve 52 at an intermediate point in its return stroke would require a sustained supply pressure of at least 320 pounds per square inch. To prevent any excess in pressure inside the fingers 66 which might assist in holding the valve 52 against return movement, I have made the aggregate opening of the orifices 76 many times greater than that of the openings 72.

Because the minimum pressure difference involved in the movement of the parts is the 40-pound pressure developed by the spring 58, it is immaterial whether a vacuum is developed or not in any part of the device. Thus, the formation of a groove in the washer 54 could not develop any vacuum that would prevent operation of the device.

It will thus be apparent that, after the reduction of pressure to a point where the valve 52 opens, no pressure that the pump is capable of producing could prevent the return of both parts of the barrier to the upper position ready for the next pressure impulse. It is also apparent that during the pressure impulse there is no transfer of lubricant past the barrier, which maintains a tight lubricant pressed seal by means of the cup leather 40 and the fiber valve seat 54.

Without further elaboration the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. A measuring valve comprising a chamber having an inlet and an outlet, a piston slidable in said chamber, a check valve in said piston opening by movement toward said inlet, a check valve in said outlet opening away from said chamber, resilient means tending to close said outlet check valve, resilient means tending to open said piston check valve, resilient means tending to move said piston toward said inlet, trigger means for holding said piston at the outlet end, and a mechanical connection between said piston check valve and said trigger means for releasing said piston when said check valve has moved to the end of its return stroke, said piston check valve being loaded to a pressure substantially greater than that of atmosphere, and said piston being loaded to a pressure substantially greater than the loading of said piston check valve.

2. A measuring valve comprising a chamber having an inlet and an outlet, a piston slidable in said chamber, a check valve in said piston opening by movement toward said inlet, a check valve in said outlet opening away from said chamber, resilient means tending to close said outlet check valve, resilient means tending to open said piston check valve, resilient means tending to move said piston toward said inlet, trigger means for holding said piston at the outlet end, and a mechanical connection between said piston check valve and said trigger means for releasing said piston when said check valve has moved to the end of its return stroke, said piston being loaded to a pressure substantially greater than the loading of said piston check valve.

3. A measuring valve comprising a chamber having an inlet and an outlet, a piston slidable in said chamber, a check valve in said piston, a check valve in said outlet, resilient means tending to close said outlet check valve, resilient means tending to open said piston check valve, resilient means tending to move said piston toward said inlet, trigger means for holding said piston at the outlet end, and a mechanical connection between said piston check valve and said trigger means for releasing said piston, said piston check valve being loaded to a pressure substantially greater than that of atmosphere, and said piston being loaded to a pressure substantially greater than the loading of said piston check valve.

4. A measuring valve comprising a chamber having an inlet and an outlet, a piston slidable in said chamber, a check valve in said piston, a check valve in said outlet, resilient means tending to close said outlet check valve, resilient means tending to open said piston check valve, resilient means tending to move said piston toward said inlet, trigger means for holding said piston at the outlet end, and a mechanical connection between said piston check valve and said trigger means for releasing said piston, said piston being loaded to a pressure substantially greater than the loading of said piston check valve.

5. A measuring valve comprising a chamber, pressure actuated means for expelling a charge from said chamber, spring actuated means for admitting a new charge to said chamber, trigger means set by expelling a charge for delaying the operation of said admitting means, and pressure sensitive means operating below a predetermined pressure less than that necessary to expel a charge to render said admitting means hydraulically operative and to trip said trigger means, and above said predetermined pressure to render said admitting means hydraulically inoperative, said predetermined pressure being substantially greater than atmospheric pressure.

6. A measuring valve comprising a chamber, means for expelling a charge from said chamber, spring actuated means for admitting a new charge to said chamber, trigger means set by expelling a charge for delaying the operation of said admitting means, and pressure sensitive means operating below a predetermined pressure to trip said trigger means, said predetermined pressure being substantially greater than atmospheric pressure.

7. A measuring valve comprising a chamber, means for expelling a charge from said chamber, means for admitting a new charge to said chamber, trigger means set by expelling a charge for delaying the operation of said admitting means, and pressure sensitive means operating below a predetermined pressure to trip said trigger means, said predetermined pressure being substantially greater than atmospheric pressure.

8. A measuring valve comprising a chamber, means for expelling a charge from said chamber, means for admitting a new charge to said chamber, trigger means set by expelling a charge for mechanically delaying the operation of said admitting means, and pressure sensitive means operating below a predetermined pressure to trip said trigger means.

9. A measuring valve comprising a chamber, means for expelling a charge from said chamber, means for admitting a new charge to said chamber, trigger means set by expelling a charge for delaying the operation of said admitting means, and means for tripping said trigger means.

10. A measuring valve comprising a chamber, means for expelling a charge from said chamber, means for admitting a new charge to said chamber, and trigger means set by expelling a charge for mechanically delaying the operation of said admitting means.

11. A measuring valve comprising a chamber, a barrier therein, means permitting said barrier to yield under a pressure impulse, by-pass means forming part of said barrier and rendered operative by displacement of said barrier and subsequent reduction in pressure for opening communication between opposite sides of said barrier, means for returning said barrier to initial position and closing said communication, and a mechanical interlock between said by-pass means and said returning means for rendering said returning means inoperative until said by-pass means has substantially completed its return movement to initial position.

12. A measuring valve comprising a chamber, a barrier therein, means permitting said barrier to yield under a pressure impulse, by-pass means rendered operative by displacement of said barrier and subsequent reduction in pressure for opening communication between opposite sides of said barrier, means for returning said barrier to initial positon and closing said communication, and a mechanical interlock between said by-pass means and said returning means.

13. A measuring valve comprising a chamber, a barrier therein normally preventing passage of lubricant therethrough, means permitting said barrier to yield under a pressure impulse, and by-pass means rendered operative by displacement of said barrier and subsequent reduction in pressure for opening communication between opposite sides of said barrier.

14. A measuring valve comprising a chamber, a barrier therein normally closing said chamber against passage of lubricant therethrough, means permitting said barrier to yield under a pressure impulse, and by-pass means forming part of said barrier and operative only below a predetermined pressure for opening communication between opposite sides of said barrier.

15. A measuring valve comprising a chamber, having an inlet and an outlet end, a first and a second movable element in said chamber, said elements when separated opening a passage through said chamber and when approximated forming a complete barrier, a first resilient pressure sensitive means acting between said elements and tending to separate them, a second resilient pressure sensitive means acting on said second element to move both elements to said inlet end and by abutment with said end to approximate said elements, an outwardly opening check valve in said outlet, said first resilient means exerting mechanical force corresponding to hydraulic pressure difference greater than atmospheric pressure, and said second resilient means being both mechanically and hydraulically more powerful than said first resilient means, and trigger means set by movement of said second element to said outlet end for locking it there, and released by movement of said first element to said inlet end.

16. A measuring valve comprising a chamber having an inlet end and an outlet end, a first and a second movable element in said chamber, said elements when separated opening a passage through said chamber and when approximated forming a complete barrier, resilient pressure sensitive means acting between said elements and tending to separate them, a second resilient pressure sensitive means acting on said second element to move both elements to said inlet end and by abutment with said end to approximate said elements, said second resilient means being both mechanically and hydraulically more powerful than said first resilient means, and trigger means set by movement of said second element to said outlet end for locking it there, and released by movement of said first element to said inlet end.

17. A measuring valve comprising a chamber having an inlet end and an outlet end, a first and a second movable element in said chamber, said elements when separated opening a passage through said chamber and when approximated forming a complete barrier, a first resilient pressure sensitive means acting between said elements and tending to separate them, a second resilient pressure sensitive means acting on said second element to move both elements to said inlet end and by abutment with said end to approximate said elements, said second resilient means being both mechanically and hydraulically more powerful than said first resilient means, and trigger means set by movement of said second element to said outlet end for locking it there.

18. A lubricating system comprising source means for producing alternate periods of low and high pressure, a bearing connected to said source, a barrier forming a complete seal against the passage of lubricant, means permitting said barrier to yield under a pressure impulse and move the lubricant column in the direction of the bearing, and automatic means operative upon relief of pressure for opening said barrier and re-establishing it at another point in the lubricant column more remote from the bearing.

19. A lubricating system comprising source means for producing alternate periods of low and high pressure, a bearing connected to said source, a barrier forming a complete seal against the passage of lubricant, means permitting said barrier to yield under a pressure impulse and move the lubricant column in the direction of the bearing, and means for opening said barrier and re-establishing it at another point in the lubricant column more remote from the bearing.

In witness whereof, I hereunto subscribe my name this 28 day of July, 1926.

DONALD H. SWEET.